ered, to pass through an eighty mesh screen. The
UNITED STATES PATENT OFFICE.

MELVILLE F. COOLBAUGH, OF RAPID CITY, AND ELWYN H. QUINNEY, OF PIERRE, SOUTH DAKOTA.

PROCESS OF PRODUCING SOLUBLE SALTS OF POTASSIUM AND ALUMINUM.

1,165,154.     Specification of Letters Patent.     Patented Dec. 21, 1915.

No Drawing. Original application filed June 2, 1913, Serial No. 771,243. Divided and this application filed April 23, 1914. Serial No. 834,010.

*To all whom it may concern:*

Be it known that we, MELVILLE F. COOLBAUGH and ELWYN H. QUINNEY, citizens of the United States, and residents, respectively, of Rapid City, in the county of Pennington and State of South Dakota, and Pierre, in the county of Hughes and State of South Dakota, have made certain new and useful Improvements in Processes of Producing Soluble Salts of Potassium and Aluminum, of which the following is a specification.

Our invention relates to improvements in processes for producing soluble salts of potassium and aluminum from silicious and argillaceous earths, rocks or minerals in which compounds of these elements exist in an insoluble form.

An object of our invention is to provide a simple process for producing potassium and aluminum sulfates, and one which is inexpensive.

A further object of our invention is to provide a process which is applicable to rocks, earths, or minerals which are found in abundance, and which form therefore a convenient supply of raw material.

Other objects and advantages will appear in the following specification and the novel steps of the process will be particularly pointed out in the appended claim.

This application is a division of a prior application, Serial No. 771,243, filed June 2, 1913.

In carrying out our process we make use of feldspar, leucite, or other rocks, shales, or clays. These are first crushed or ground to pass through an eighty mesh screen. The powdered material is then thoroughly mixed with gypsum or limestone which has been previously crushed to the same fineness. The proportions of the argillaceous and silicious rock and the gypsum or limestone will vary in accordance with the composition of the rock, earth or minerals. For the treatment of feldspar rock containing ten per cent. of potash we prefer to use one part of the feldspar by weight to one and eight-tenths parts of gypsum. When limestone is used the proportion is one part of feldspar to one and one-tenth part by weight of limestone.

The proportion of gypsum and limestone to be used may be widely varied when used with the different rocks, earths, or minerals. The gypsum should be added in the proportion of two and eight-tenth parts of gypsum by weight to one part of silica by weight contained in the feldspar, leucite, and other rocks, shales, and clays, while if limestone is used one and seven-tenths parts of limestone by weight is added for each one part of silica by weight contained in the silicious materials. Where the rocks, earths or minerals contain lime as one of their constituents the amount of lime or gypsum to be used should be decreased according to the amount already contained.

The mixture of the silicious or argillaceous material and the gypsum or limestone is heated to incipient fusion, is then cooled quickly and crushed to a powder. It is then leached with water containing for the treatment of ordinary feldspar three and five-tenths parts of sulfuric acid by weight to each one part by weight of feldspar. The proportion of sulfuric acid to be used in the treatment of feldspar and the other rocks, earths, or minerals will depend upon the proportion of potash and alumina contained therein. For the most efficient treatment one and two-tenths parts of sulfuric acid by weight is used to each one part of potash by weight and three parts of sulfuric acid by weight to each one part of alumina by weight. After the leaching has been accomplished the potash and alumina as potassium and aluminum sulfates are then separated from the solution by crystallization.

The yield of potash and alumina is ordinarily from ninety to ninety-two per cent. of potash and from ninety-three to ninety-eight per cent. of alumina contained in the feldspar or the other rocks, earths or minerals treated.

In the foregoing specification the specific examples are given by way of illustration only, and it will be understood that the proportions in which the various substances are brought together may vary without departing from the spirit and the scope of the invention.

We claim:

The herein described process of producing soluble salts of aluminum and potassium from silicious rocks, earths, or minerals containing insoluble compounds of potassium and aluminum, which consists in reducing the rocks, earths, or minerals to powdered form, mixing therewith gypsum in the proportion of two and eight-tenths parts of gypsum by weight to each one part of silica by weight contained in said rocks, earths, or minerals, heating the mixture to incipient fusion, cooling quickly, leaching the product with dilute sulfuric acid, and separating the potassium and aluminum sulfates from the resulting solutions by crystallization.

MELVILLE F. COOLBAUGH.
ELWYN H. QUINNEY.

Witnesses for Melville F. Coolbaugh:
C. C. CRABTREE,
J. P. KNOX.
Witnesses for Elwyn H. Quinney:
H. F. CHAPMAN,
E. A. JONES.